United States Patent [19]

Egashira et al.

[11] Patent Number: 4,866,117
[45] Date of Patent: Sep. 12, 1989

[54] DEEP DRAWING PROCESS OF RESIN SHEET

[75] Inventors: Akihiko Egashira; Takao Yazaki; Tetsuzi Kakizaki; Toshikazu Mizutani, all of Mie, Japan

[73] Assignee: Mitsubishi Petrochemical Co., Ltd., Tokyo, Japan

[21] Appl. No.: 52,980

[22] Filed: May 22, 1987

[30] Foreign Application Priority Data

May 30, 1986 [JP] Japan .................. 61-125151

[51] Int. Cl.$^4$ .......................... C08J 5/18; B29B 7/90; B29C 51/08; C08K 3/00
[52] U.S. Cl. .................... 524/406; 264/512; 264/544; 264/331.15; 524/408; 524/413; 524/418; 524/423; 524/424; 524/425; 524/430; 524/431; 524/432; 524/433; 524/435; 524/436; 524/442; 524/522
[58] Field of Search ............... 264/544, 512, 331.15; 524/406, 408, 413, 418, 423, 424, 425, 430, 431, 432, 433, 435, 436, 442, 522

[56] References Cited

U.S. PATENT DOCUMENTS

| 4,350,652 | 9/1982 | Theysohn et al. | 264/331.15 |
| 4,486,378 | 12/1984 | Hirata et al. | 264/512 |
| 4,567,089 | 1/1986 | Hattori et al. | 428/213 |

FOREIGN PATENT DOCUMENTS

| 55-108433 | 8/1980 | Japan . |
| 55-152736 | 11/1980 | Japan . |
| 57-21441 | 2/1982 | Japan . |
| 59-165654 | 9/1984 | Japan . |

Primary Examiner—Philip Anderson
Attorney, Agent, or Firm—Oblon, Spivak, McClelland, Maier & Neustadt

[57] ABSTRACT

A deep drawing process, comprising melt-softening a resin sheet obtained from a resin composition comprising:
(a) from 15 to 82% by weight of a propylene-series resin,
(b) from 15 to 82% by weight of an ethylene-series resin, and
(c) from 3 to 50% by weight of carbon black, each based on the total amount of the components (a), (b), and (c), and
(d) from 1 to 50 parts by weight, per 100 parts by weight of the total amount of the components (a), (b), and (c), of an inorganic filler, at a temperature not lower than the melting point of the propylene-series resin and molding the softened resin sheet by differential pressure molding or press molding, wherein the resin sheet is molded at a draw ratio of from 2.0 to 3.5.

9 Claims, 1 Drawing Sheet

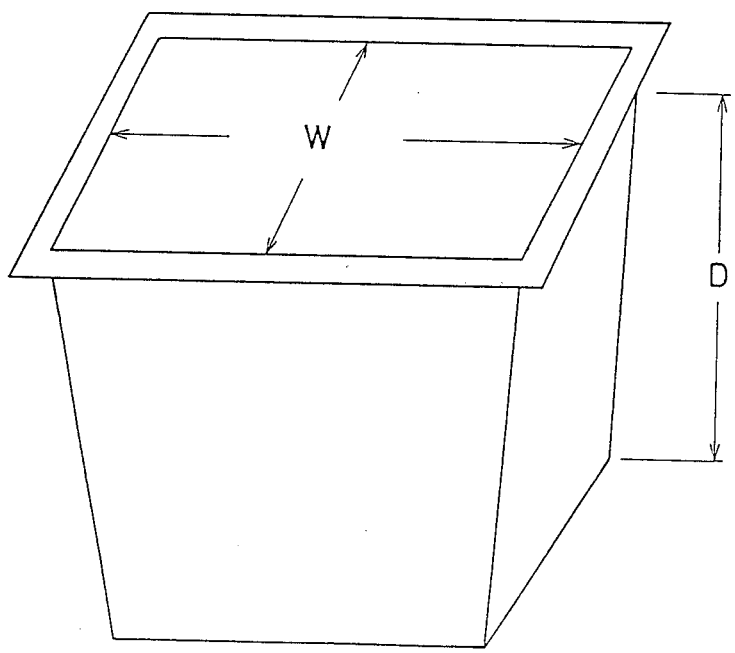

DEEP DRAWING PROCESS OF RESIN SHEET

FIELD OF THE INVENTION

This invention relates to differential pressure molding or press molding of a resin sheet for obtaining deep drawing-molded articles which are useful as transporter trays for IC parts, packaging containers or covers for magnetic tapes, and the like.

BACKGROUND OF THE INVENTION

It is known that a resin sheet comprising polypropylene, high-density polyethylene, and an inorganic filler is excellent in vacuum moldability as described in U.S. Pat. No. 4,567,089 corresponding to Japanese Laid-Open patent application No. 165654/84. The vacuum molded articles obtained therefrom are useful as interior materials of a refrigerator or packaging trays. The above U.S. Patent discloses that the molded articles obtained have a draw ratio of 1.0 and a uniform thickness.

Vacuum molding, pressure air molding, and vacuum molding with a pressure air (inclusively referred to as differential pressure molding or so-called "thermoforming") and press molding are advantageous in terms of cost incurred for molds and devices as compared with injection molding (cf. Japanese Laid-Open patent application No. 152736/80). This advantage leads to a reduced cost of products and a cheap supply of products.

However, drawing limits of the conventional deep drawing sheets for obtaining containers or trays having a practically uniform thickness were unsatisfactory. For example, the possible highest draw ratio of a noncrystalline resin sheet (e.g., a polyvinyl chloride sheet and a high-impact polystyrene sheet), a polypropylene sheet or a high-density polyethylene sheet is 1.5, 0.8 or 1.0, and the draw ratio of the aforesaid resin sheet of U.S. Pat. No. 4,567,089 which comprises polypropylene, polyethylene and an inorganic filler is 1.5 at the highest as shown in Comparative Example 2 hereinafter described.

The term "draw ratio" as used herein means a ratio of depth D to width W of a molded container as shown in the accompanying drawing (hereinafter referred to as D/W ratio).

If molded articles, such as containers and trays, having a D/W ratio of at least 2 could be obtained by differential pressure molding or press molding, they would develop a broader market.

SUMMARY OF THE INVENTION

One object of this invention is to provide differential pressure molding or press molding of a resin sheet for obtaining deep drawing-molded articles having a D/W ratio of at least 2.

It has now been found that deep drawing-molded articles having a D/W ratio of 3.5 at the highest can be obtained by using a resin sheet comprising a polyolefin resin composition comprising polypropylene, polyethylene, carbon black, and, optionally, an inorganic filler.

That is, the present invention relates to a deep drawing process comprising melt-softening a resin sheet obtained from a resin composition comprising:

(a) from 15 to 82% by weight of a propylene-series resin, (b) from 15 to 82% by weight of an ethylene-series resin, and (c) from 3 to 50% by weight of carbon black, each based on the total amount of the components (a), (b), and (c), and (d) up to 150 parts by weight, per 100 parts by weight of the total amount of the components (a), (b), and (c), of an inorganic filler, at a temperature not lower than the melting point of the propylene-series resin (a) and molding the softened resin sheet by differential pressure molding or press molding.

BRIEF DESCRIPTION OF THE DRAWING

The accompanying drawing illustrates a perspective view of a container obtained by deep drawing. In the drawing, D and W indicate a depth and a width, respectively.

DETAILED DESCRIPTION OF THE INVENTION

The propylene-series resin which can be used in the present invention includes not only a propylene homopolymer (homopolypropylene) but also a usual propylene copolymer, such as a block or random copolymer of propylene and other olefins including ethylene, polypropylene to which a vinyl-monomer, e.g., acrylic acid and maleic anhydride, is grafted, and the like. The propylene copolymers to be used should have a propylene content of at least 50% by weight. Of these propylene-series resins, a propylene/ethylene block copolymer is preferred in view of compatibility with an ethylene-series resin as component (b).

A propylene-series resin of any grade can be selected according to performance requirements, such as formability, mechanical properties, and particularly stiffness, heat resistance, and the like of the resulting resin composition. In general, a propylene-series resin having a melt flow rate (MFR) of from 0.2 to 30 g/10 min. is employed.

The ethylene-series resin which can be used in the present invention includes high-density polyethylene having a density of at least 0.945 g/cm$^3$, linear polyethylene having a density of from 0.901 to 0.935, and a metal salt of an ethylene/methacrylic acid copolymer called ionomer, e.g., Surlyn A produced by E.I. du Pont Numerous. Preferred examples of the ethylene-series resin includes the linear polyethylene and the high-density polyethylene.

The ethylene-series resin as component (b) functions to improve the drawing properties of a resin sheet and to reduce sagging of the resin sheet.

The carbon black which can be used in the present invention may be conventional and includes furnace black, channel black, etc. The carbon black as component (c) contributes to improvements in drawing properties and conductivity. In particular, use of super conductive furnace (SCF), conductive furnace (CF), or Ketjen Black (a trade name of AKZO Co.) which is an extraconductive furnace (XCF) is advantageous to attain high conductivity at a small compounding ratio.

The inorganic filler which can be used in the present invention for improving stiffness and drawing properties of the resin sheet includes oxides, hydroxides, sulfides, carbonates, sulfates or silicates of the group I to VIII metals (inclusive of semi-metals) of Periodic Table (e.g., Na, K, Ca, Mg, Ba, Zn, Al, Fe, Ti, etc.) and various mineral fine powders containing some of these compounds. Specific examples of the inorganic fillers to be loaded are iron oxide, zinc oxide, titanium oxide, alumina, silica, calcium oxide, aluminum hydroxide, magnesium hydroxide, calcium hydroxide, magnesium carbonate, calcium carbonate (ground, precipitated, or colloidal), barium sulfate, calcium sulfate, calcium silicate, talc, wollastonite, clay, glass beads, glass powders, silica sand, ground quartz, volcanic ash, diatomaceous earth, and the like. These inorganic fillers may be used either individually or in combinations of two or more thereof.

The mean particle size of the inorganic filler can be selected arbitrarily depending on required performances and is, in general, up to 20 $\mu$m, and preferably up to 5 $\mu$m.

In addition to the above-described components (a), (b), (c) and (d), the resin composition according to the present invention may further contain an antioxidant, a ultraviolet absorbent, a propylene/ethylene copolymer rubber, a propylene/ethylene/diene monomer copolymer rubber, polystyrene, acrylonitrile/butadiene/styrene copolymer, styrene/butadiene/styrene block copolymer and the like.

The compounding ratios of the propylene-series resin (a), the ethylene-series resin (b), and carbon black (c) are from 15 to 82% by weight, from 15 to 82% by weight, and from 3 to 50% by weight, respectively, based on the total weight of the components (a), (b), and (c). Preferred compounding ratios of the components (a), (b), and (c) are from 25 to 60% by weight, from 35 to 60% by weight, and from 5 to 25% by weight, respectively, based on the total weight of the components (a), (b), and (c). The inorganic filler (d) is used in an amount up to 150 parts, and preferably of from 15 to 50 parts by weight, per 100 parts by weight of the total amount of the components (a), (b), and (c).

If the proportion of the component (b) is less than 15% by weight, the moldability of the resulting resin sheet, i.e., drawing property and sag resistance, is deteriorated only to produce molded articles having poor appearance. If it exceeds 82% by weight, the molded articles have reduced strength.

If the proportion of the component (c) is less than 3% by weight, improvement on drawing property is insufficient, and if it exceeds 50% by weight, the resin sheet has reduced mechanical properties and an increased sag.

Since a large quantity of the inorganic filler (d) would lead to reduction in strength of molded articles, the proportion of the component (d) is preferably selected so as to be within a range of from 1 to 50 parts by weight per 100 parts by weight of the polyolefin resins, i.e., the total amount of the components (a) and (b), with the sum of the components (c) and (d) falling within a range of from 3 to 90 parts by weight per 100 parts by weight of the polyolefin resins.

The resin composition according to the present invention can be obtained easily by mixing the above-described components by the use of a batch mixer, e.g., a Banbury mixer, a mixing roll, a Brabender Plastograph, etc., as well as a continuous extruder, e.g., a single-screw extruder, a twin-screw extruder, etc. The order of compounding is not particularly limited. The compounding components may be kneaded either all at once or dividedly. For example, the ethylene-series resin and carbon black may first be kneaded in a batch or continuous extruder and the blend is then kneaded with the propylene-series resin and inorganic filler; the ethylene-series resin, inorganic filler and carbon black are first kneaded and the blend is then kneaded with the propylene-series resin; or a blend of the ethylene-series resin, inorganic filler, and carbon black is dry blended with the propylene-series resin, followed by extrusion forming.

The resin composition is extruded into a resin sheet having a thickness of from 0.3 to 5 mm. In carrying out deep drawing, the resulting resin sheet is melted by heating to a temperature above the melting point of the propylene-series resin (a), followed by plug-assisted differential pressure molding or by press molding by means of a matched die. The thus molded articles have a D/W ratio of from 0.05 up to 3.5, preferably from 1.0 to 3.0.

If it is desired to improve appearance of the molded articles, a polypropylene gloss layer or a polypropylene coloring layer containing a pigment may be provided on the resin sheet to a thickness not exceeding 50% of the base resin sheet comprising the components (a) (b), (c), and, optionally, (d) (cf. U.S. Pat. No. 4,567,089), and the resulting laminate can be subjected to molding in the same manner as described above.

The molded articles obtained by the process of this invention are useful as containers, toys, interior materials of refrigerators, interior parts of automobiles, etc. In particular, existence of carbon black having conductivity makes the molded articles useful as containers for IC parts, electromagnetic shielding materials for packages of printers or computers.

The present invention will now be illustrated in greater detail by way of the following examples, but it should be understood that the present invention is not limited thereto. In these examples, all the percents and parts are given by weight unless otherwise indicated.

EXAMPLE 1

A mixture consisting of 27 parts of a propylene/ethylene block copolymer (MFR: 0.5 g/10 min.; melting point: 161–163° C.), 64 parts of high-density polyethylene (density: 0.950 g/cm$^3$), 9 parts of Ketjen Black, and 22 parts of talc having a mean particle size of 3 $\mu$m was melt-kneaded at 220° C in an extruder [screw diameter: 50 mm$\phi$;L/D (screw length/screw diameter): 24; manufactured by Mitsubishi Heavy Industries, Ltd.]and extruded into a sheet form from a coathanger die at 225° C., followed by cooling with a touch roll to obtain a resin sheet having a thickness of 1 mm.

EXAMPLES 2 TO 6 AND COMPARATIVE EXAMPLES 1 TO 3

A 1 mm thick resin sheet was obtained in the same manner as described in Example 1, except for using each of the compositions shown in Table 1.

EXAMPLE 7

A mixture consisting of 30 parts of a crystalline propylene/ethylene block copolymer (ethylene content: 5%, MFR: 0.5 g/10 min.; boiling heptane extraction residue: 98%), 45 parts of polyethylene (density: 0.950 g/cm$^2$; MFR: 0.6 g/10 min.), 25 parts of carbon black, and 20 parts of talc (mean particle size: 1.5 $\mu$m) was kneaded in an extruder and extruded into a strand form, followed by cutting to obtain pellets.

The resin pellets for deep drawing were fed to a triple layer multi-manifold die (width: 700 mm) at 230° C. by the use of an extruder (screw diameter: 90 mm$\phi$), and at the same time, a crystalline propylene homopolymer (MFR: 2.0 g/10 min.; boiling heptane extraction residue: 99%) as a resin for a gloss surface layer was fed from a separate extruder (screw diameter: 40 mm$\phi$) to the same die at 220° C. The die temperature was 220° C. The molten sheet extruded from the die was cooled to solidify successively with three rolls having a width of 700 mm. The cooled sheet was then, subjected to corona discharge treatment to obtain a laminated resin sheet for vacuum molding. The temperatures of the cooling rolls were 40° C., 95° C., and 50° C. in order of distance from the die. The rotating speed of the rolls was 1.5 m/min. The resulting laminated resin sheet had a thickness of 1.5 mm in total, with the thickness of the gloss surface layer being 0.15 mm and that of the base sheet being 1.35 mm.

COMPARATIVE EXAMPLE 4

A mixture of 100 parts of a propylene/ethylene block copolymer and 22 parts of talc was extruded into a sheet at 220° C, followed by cooling to obtain a 1 mm thick resin sheet.

Each of the sheets prepared in the foregoing Examples and Comparative Examples was evaluated for performances in accordance with the test methods as described below, and the results obtained are shown in Table 1.

(1) Deep Drawing Moldability:

The resin sheet was clamped between two plates (250×250×3 mm) having a hole of 150 mm in diameter in the center and placed horizontally in a heat-insulating box. In the case of using a double-layered resin sheet, the gloss layer was faced upward. A heater heated to 450° C. was set at a height of 15 cm above the resin sheet to uniformly heat the resin sheet. The heated resin sheet first expanded toward the heater. When the resin sheet temperature was leveled throughout its thickness, the resin sheet again became horizontal, and thereafter, sagged by gravity.

Moldability of the resin sheet was evaluated through a series of deep draw tests for each resin sheet while varying the preheating time as follows. Taking the preheating time for the resin sheet first tested to again become horizontal as a standard time, the heater was removed either before or after the standard time at 5 second intervals. A force plug which had a tip radius of 40 mm and was wound up with felt so as to have a diameter of 80 mm was forced into the resin sheet at the hole at a rate of 400 mm/sec. under a pressure of 1.0 Kg/cm$^2$ to a depth of 150 mm (draw ratio: 1.0) or 300 mm (draw ratio: 2.0). After cooling, the plug was withdrawn. Uniformity in thickness of the molded article was examined by passing light therethrough or by means of a dial gauge.

The time of preheating by which a molded article having a D/W ratio of 1.0 or 2.0 and even thickness could be obtained was determined. The longer the preheating time, the broader the moldable temperature range, indicative of higher moldability.

(2) Drawing Limits:

Deep drawing was carried out in the same manner as in 1) above, except that the draw ratio, i.e., the depth of the plug to be forced in, was gradually increased within a proper heating time range until molding at the predetermined draw ratio became impossible (the resin sheet was broken) at any heating time. The maximum draw ratio at which the resin sheet could be drawn without breaking was taken as a drawing limit.

(3) Sag:

The resin sheet was fixed to a clamping frame having a square hole (230 mm×230 mm) to form a heating surface and heated with a heater as used in 1) above for 150 seconds. The maximum distance from the horizontal line of the resin sheet to the sagging resin sheet was measured with a scale graduated in 0.5 milimeters.

(4) Three-Point Bending Strength:

Measured in accordance with JIS K7203.

(5) Surface Resistivity:

Measured by means of a surface resistometer of four-terminal system ("Loresta" manufactured by Mitsubishi Petrochemical Co., Ltd.).

TABLE 1

| | Ex. 1 | Comparative Ex. 1 | Comparative Ex. 2 | Ex. 2 | Ex. 3 | Ex. 4 | Ex. 5 | Ex. 6 | Comparative Ex. 3 | Ex. 7 | Comparative Ex. 4 |
|---|---|---|---|---|---|---|---|---|---|---|---|
| Layer Structure | single | single | single | single | single | single | single | single | single | double | single |
| Composition (part): | | | | | | | | | | | |
| Propylene/ethylene block copolymer | 27 | 29 | 30 | 19 | 27 | 60 | 27 | 70 | 86 | 30 | 100 |
| High-density polyethylene | 64 | 70 | 70 | 46 | 64 | 31 | — | — | 5 | 45 | — |
| Linear polyethylene | — | — | — | — | — | — | 64 | — | — | — | — |
| Surlyn A | — | — | — | — | — | — | — | 20 | — | — | — |
| Ketjen Black | 9 | 1 | — | 35* | 9 | 9 | 9 | 10 | 9 | 25** | — |
| Talc | 22 | 22 | 22 | 22 | — | 22 | 22 | 22 | 22 | 20 | 22 |
| Test Results: | | | | | | | | | | | |
| Deep drawing moldability (sec.) | | | | | | | | | | | |
| D/W = 1.0 | 15 | 5 | 5 | 10 | 15 | 15 | 15 | 15 | 5 | 15 | impossible |
| D/W = 2.0 | 5 | impossible | impossible | 2.5 | 5 | 5 | 5 | 5 | impossible | 5 | " |
| Drawing Limit (D/W) | 3.5 | 1.5 | 1.5 | 3.0 | 3.5 | 3.0 | 3.0 | 3.0 | 1.5 | 3.5 | 0.75 |
| Sag (mm) | 11 | 7 | 6 | 15 | 12 | 13 | 15 | 7 | 28 | 15 | 7 |
| Three-point bending strength (kg/cm$^2$) | 420 | 430 | 430 | 310 | 150 | 450 | 330 | 350 | 480 | 350 | 440 |
| Surface resistivity ($\Omega \cdot cm^{-1}$) | $10^4$ | $10^{12}<$ | $10^{12}<$ | $10^3$ | $10^4$ | $10^4$ | $10^4$ | $10^4$ | $10^4$ | $10^4$ | $10^{12}<$ |

While the invention has been described in detail with reference to specific embodiments thereof, it will be apparent to one skilled in the art that various changes and modifications can be made therein without departing from the spirit and scope thereof.

What is claimed is:

1. A resin sheet which is capable of being deep drawing-molded at a draw ratio of from 2.0 to 3.5, at a temperature of not lower than the melting point of a propylene-series resin, which is obtained from a resin composition comprising:
- (a) from 15–82% by weight of a propylene-series resin comprising a propylene homopolymer or copolymer having a propylene content of at least 50% by weight, said propylene-series having a melt flow rate of from about 0.2–30 g/10 min.;
- (b) from 15–82% by weight of an ethylene-series resin comprising a high-density polyethylene having a density of at least 0.945 g/cm$^3$, a linear polyethylene having a density of from 0.901 to 0.935 and a metal salt of an ethylene-methacrylic acid copolymer;
- (c) from 3–50% by weight of carbon black each percentage being based upon the total amount of components (a), (b) and (c); and
- (d) from 1–50 parts by weight, per 100 parts by weight of the total amount of components (a), (b) and (c) of an inorganic filler.

2. A deep drawing-molded resin sheet which is produced by:
- (a) melt softening a resin sheet which is capable of being deep drawing-molded at a draw ratio of from 2.0 to 3.5, which is obtained from a resin composition comprising:
  - (i) from 15–82% by weight of propylene-series resin comprising a propylene homopolymer or copolymer having a propylene content of at least 50% by weight, said propylene-series resin having a melt flow rate of from about 0.2–30 g/10 min.;
  - (ii) from 15–82% by weight of an ethylene-series resin comprising a high-density polyethylene having a density of at least 0.945 g/cm$^3$, a linear polyethylene having a density of from 0.901 to 0.935 and a metal salt of an ethylene-methacrylic acid copolymer;
  - (iii) from 3–50% by weight of carbon black each percentage being based upon the total amount of components (a), (b) and (c); and
  - (iv) from 1–50 parts by weight, per 100 parts by weight of the total amount of components (a), (b) and (c) of an inorganic filler; and
- (b) molding the softened resin sheet by differential pressure molding or press molding, and wherein the molding is carried out at a draw ratio of from 2.0–3.5.

3. A deep drawing process comprising melt-softening a resin sheet obtained from a resin composition comprising:
- (a) from 15–82% by weight of a propylene-series resin comprising a propylene homopolymer or copolymer having a propylene content of at least 50% by weight, said propylene series resin having a melt flow rate of from about 0.2–30 g/10 min.;
- (b) from 15–82% by weight of an ethylene-series resin comprising a high-density polyethylene having a density of at least 0.945 g/cm$^3$, a linear polyethylene having a density of from 0.901 to 0.935 and a metal salt of an ethylene-methacrylic acid copolymer;
- (c) from 3–50% by weight of carbon black, each percentage being based upon the total amount of components (a), (b) and (c); and
- (d) from 1–50 parts by weight per 100 parts by weight of the total amount of components (a), (b) and (c) of an inorganic filler, at a temperature of not lower than the melting point of said propylene-series resin and molding the softened resin sheet by differential pressure molding or press molding, and wherein said molding is carried out at a draw ratio of from 2.0–3.5.

4. The deep drawing process as in claim 3, wherein said ethylene-series resin is linear polyethylene or high-density polyethylene.

5. The deep drawing process as in claim 3, wherein said resin composition comprises
- (a) from 25 to 60% by weight of the propylene-series resin,
- (b) from 35 to 60% by weight of the ethylene-series resin, and
- (c) from 5 to 25% by weight of the carbon black, each based on the total amount of the components (a), (b), and (c), and
- (d) from 15 to 50 parts by weight of the inorganic filler per 100 parts by weight of the total amount of the components (a), (b), and (c).

6. The deep drawing process as in claim 3, wherein the carbon black and inorganic filler are present in a total amount of from 3 to 90 parts by weight per 100 parts by weight of the sum of the propylene-series resin and ethylene-series resin.

7. The deep drawing process as in claim 3, wherein said inorganic filler is one or more oxides, hydroxides, sulfides, carbonates, sulfates or silicates of one or more Group I to VIII metals of the Periodic Table.

8. The deep drawing process as in claim 7, wherein said metal is selected from the group consisting of Na, K, Ca, Mg, Ba, Zn, Al, Fe and Ti.

9. The deep drawing process as in claim 3, wherein said resin sheet has a thickness of from 0.3 to 5 mm.

* * * * *